United States Patent
Sevener et al.

(10) Patent No.: US 7,510,995 B2
(45) Date of Patent: *Mar. 31, 2009

(54) APPLICATION OF A MIXED METAL OXIDE CATALYST TO A METALLIC SUBSTRATE

(75) Inventors: Kathleen M. Sevener, Los Angeles, CA (US); Kevin A. Lohner, Los Angeles, CA (US); Jeffrey A. Mays, Woodland Hills, CA (US); Daniel L. Wisner, Valencia, CA (US)

(73) Assignee: United Technologies Corporation, Hartford, CT (US)

( * ) Notice: Subject to any disclaimer, the term of this patent is extended or adjusted under 35 U.S.C. 154(b) by 255 days.

This patent is subject to a terminal disclaimer.

(21) Appl. No.: 10/404,935

(22) Filed: Apr. 1, 2003

(65) Prior Publication Data

US 2005/0282703 A1  Dec. 22, 2005

(51) Int. Cl.
- *B01J 23/00* (2006.01)
- *B01J 21/00* (2006.01)
- *B01J 20/00* (2006.01)

(52) U.S. Cl. ............ 502/330; 502/324; 502/333; 502/339; 502/348; 502/439

(58) Field of Classification Search ......... 502/202, 502/207, 238, 241, 243, 262, 263, 302, 319, 502/320, 324, 327, 330, 333, 339, 347, 348, 502/439

See application file for complete search history.

(56) References Cited

U.S. PATENT DOCUMENTS

| | | | | |
|---|---|---|---|---|
| 3,446,606 A | * | 5/1969 | Friedrich et al. | 428/551 |
| 3,488,962 A | * | 1/1970 | McCormick | 60/218 |
| 3,560,407 A | * | 2/1971 | McCormick | 502/302 |
| 3,646,405 A | * | 2/1972 | Wallis et al. | 361/518 |
| 4,104,421 A | * | 8/1978 | Maher et al. | 427/102 |
| 4,130,506 A | * | 12/1978 | Collier et al. | 252/1 |
| 4,160,227 A | * | 7/1979 | Ikegami et al. | 338/22 R |
| 4,214,106 A | * | 7/1980 | Freudenberger et al. | 568/864 |
| 4,220,559 A | * | 9/1980 | Polinski | 502/250 |
| 4,274,877 A | * | 6/1981 | Collier et al. | 75/252 |
| 4,415,624 A | * | 11/1983 | Prabhu et al. | 428/209 |
| 4,528,613 A | * | 7/1985 | Stetson et al. | 361/321.5 |
| 4,574,055 A | * | 3/1986 | Asada et al. | 252/514 |
| 4,621,066 A | * | 11/1986 | Nishigaki et al. | 501/128 |
| 4,743,577 A | * | 5/1988 | Schroeder et al. | 502/326 |
| 4,849,380 A | * | 7/1989 | Sawhill | 501/77 |
| 4,888,317 A | * | 12/1989 | DeAngelis et al. | 502/60 |

(Continued)

*Primary Examiner*—Cam N. Nguyen
(74) *Attorney, Agent, or Firm*—Carlson, Gaskey & Olds

(57) ABSTRACT

A method for applying a mixed metal oxide catalyst to a metallic substrate for the creation of a robust, high temperature catalyst system for use in decomposing propellants, particularly hydrogen peroxide propellants, for use in propulsion systems. The method begins by forming a prepared substrate material consisting of a metallic inner substrate and a bound layer of a noble metal intermediate. Alternatively, a bound ceramic coating, or frit, may be introduced between the metallic inner substrate and noble metal intermediate when the metallic substrate is oxidation resistant. A high-activity catalyst slurry is applied to the surface of the prepared substrate and dried to remove the organic solvent. The catalyst layer is then heat treated to bind the catalyst layer to the surface. The bound catalyst layer is then activated using an activation treatment and calcinations to form the high-activity catalyst system.

23 Claims, 2 Drawing Sheets

U.S. PATENT DOCUMENTS

| | | | |
|---|---|---|---|
| 5,468,694 A * | 11/1995 | Taguchi et al. | 501/77 |
| 6,174,462 B1 * | 1/2001 | Oka et al. | 252/514 |
| 6,238,847 B1 * | 5/2001 | Axtell et al. | 430/322 |
| 6,338,893 B1 * | 1/2002 | Kodera et al. | 428/210 |
| 6,387,346 B1 * | 5/2002 | Bertsch-Frank et al. | 423/584 |
| 6,834,494 B2 * | 12/2004 | Lohner et al. | 60/218 |
| 6,887,821 B2 * | 5/2005 | Mays et al. | 502/202 |

* cited by examiner

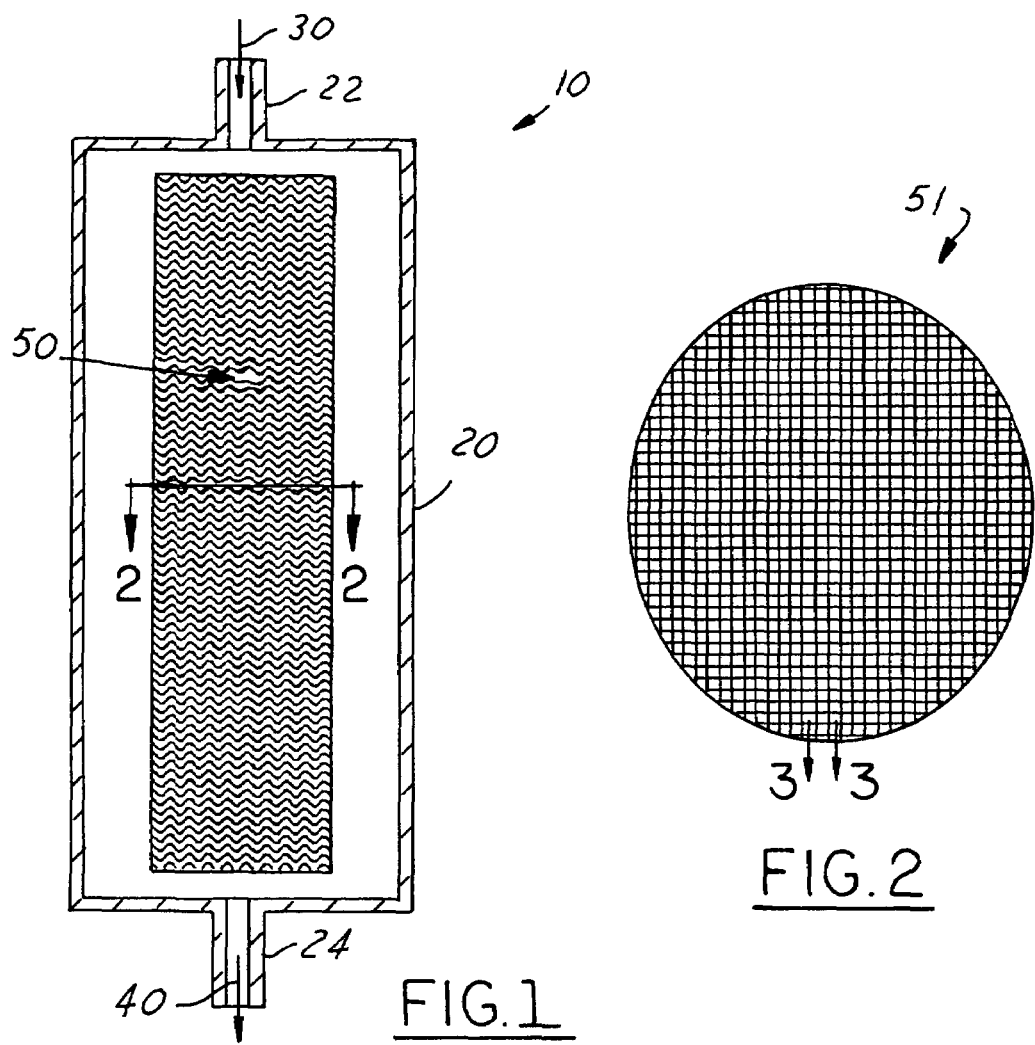
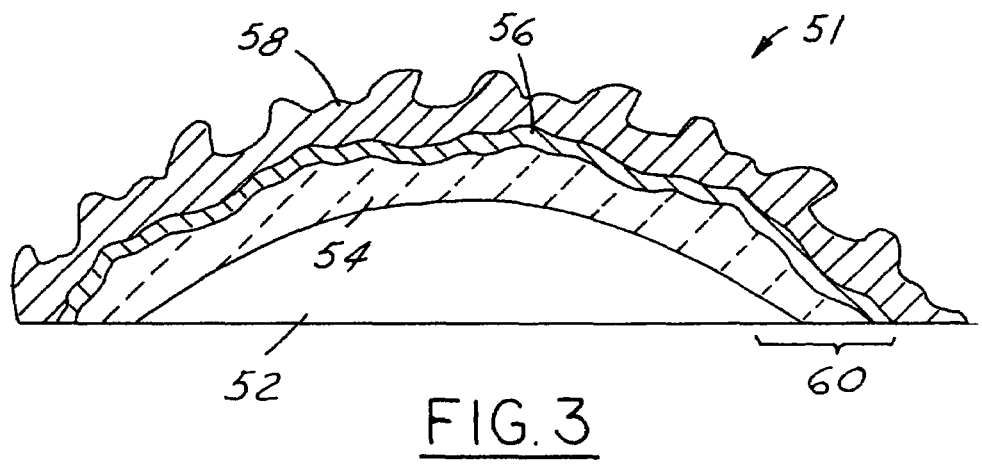

APPLICATION OF A MIXED METAL OXIDE CATALYST TO A METALLIC SUBSTRATE

STATEMENT REGARDING FEDERALLY SPONSORED RESEARCH

This invention described herein was made in the performance of work under NASA contract No. NCC8-193 and is subject to the provisions of Section 305 of the National Aeronautics and Space Act of 1958 (72 Stat. 435: 42 U.S.C. 2457).

TECHNICAL FIELD

The present invention generally relates to propulsion systems and more specifically to applying a mixed metal oxide catalyst to a metallic substrate.

BACKGROUND ART

Safer, less toxic propellants that meet operational performance requirements have long been sought by the propulsion industry. The commitment to increasingly safer and lower cost orbit space operations, as evidenced by a central charter of the Space Launch Initiative, has made success in testing less toxic propellants more imperative than ever. Less toxic propulsion systems are being developed to replace engine systems that use more hazardous propellants, such as Nitrogen Tetroxide (NTO) and Monomethyl Hydrazine (MMH).

Hydrogen peroxide offers many potential benefits as a non-toxic propellant source for target, space, and on-orbit applications. Hydrogen peroxide can be decomposed by passing it over a catalyst. The catalyst bed decomposes the hydrogen peroxide to produce super-heated steam and oxygen. The hot gases can be used to drive gas turbines, provide thrust as a monopropellant, provide an oxidizer for a bipropellant system, or function as an igniter for a rocket engine when combined with fuels like kerosene.

Ninety-eight (98%) percent hydrogen peroxide is an excellent oxidizer for many space applications, both in monopropellant and bipropellant systems, because it is non-cryogenic, has high density, and can be used as a regenerative coolant. However, the high adiabatic decomposition temperature of 98% hydrogen peroxide (1734 degrees Fahrenheit at one atmosphere, versus 1364 degrees Fahrenheit for 90% hydrogen peroxide) causes melting of conventional silver-screen catalysts currently used to decompose 90% hydrogen peroxide.

Beyond traditional silver catalysts, many catalysts are already known for the decomposition of hydrogen peroxide. Metals such as gold, platinum and palladium, in addition to oxides such as manganese dioxide are known to be active catalysts for the decomposition of hydrogen peroxide. However, these catalysts have performance limitations in the decomposition of high concentrations of hydrogen peroxide. These limitations include low melting temperatures, low activity and sensitivity to stabilizers contained in the hydrogen peroxide solutions.

Therefore, there is a need for developing a catalyst system with enhanced temperature capability, high activity and low sensitivity to stabilizers that can safely operate with up to about 99% concentration hydrogen peroxide propellant systems.

Further, a similar need exists for catalyst systems that may be used for the catalytic combustion of hydrocarbon/air mixtures. Such a catalyst system could be used in the power generation or automotive industries for emission control applications.

SUMMARY OF THE INVENTION

The present invention proposes a method for applying a mixed metal oxide (MMO) catalyst to a metallic substrate for the creation of a robust, high-activity catalyst system for long duration use with up to about 99% concentration hydrogen peroxide propellant systems and with hydrocarbon/air mixtures.

The material systems are available in two preferred types, hereinafter referred to as Type I and Type II catalyst systems. The catalysts are formed as mixtures of powder constituents that are blended together and applied to a substrate material by dipping, painting, spraying, or brushing. The catalyst coated substrate is then heated to bind the catalyst to the substrate. The catalyst then receives an appropriate activation treatment prior to use for decomposing hydrogen peroxide.

The Type I and Type II catalysts offer numerous advantages that make them ideal for propulsion systems as described in the previous paragraph. For example, these catalysts require no special pre-heat apparatus or special sequencing to meet start-up requirements. This enables faster overall response time for the propulsion system. Start up transients consistently less than 1 second have been achieved with catalyst beds containing Type I and II catalysts and subject to propellant temperatures as low as 50 degrees Fahrenheit.

The Type I and II catalysts also have demonstrated high decomposition efficiency and extremely low decomposition roughness (less than +/−1% deviation from average operating pressure) during long operating runs (greater than 10,000 seconds cumulative life) on a single propulsion unit. The Type I and II catalysts are operable with propellant concentrations of between approximately 70 and 99 percent hydrogen peroxide and decomposition temperatures between 500 and 1800 degrees Fahrenheit. A further benefit is that the catalyst has been demonstrated to be quite insensitive to elevated concentrations of contaminants and stabilizers (such as phosphate and tin) that can poison traditional catalysts under ideal conditions.

The MMO catalysts systems are also available for other propellant systems that involve similar decomposition processes. For example, the Type II catalyst system described above may also be used in propellant systems involving the combustion of methane or other hydrocarbons with an oxidizer, such as air.

Other objects and advantages of the present invention will become apparent upon considering the following detailed description and appended claims, and upon reference to the accompanying drawings.

BRIEF DESCRIPTION OF THE DRAWINGS

FIG. 1 is schematic of a gas generator assembly according to one preferred embodiment of the present invention;

FIG. 2 is a section view of the catalyst bed portion of FIG. 1 showing a single screen;

FIG. 3 is a section view of FIG. 2 illustrating the various layers of the catalyst system as applied on a single wire of the screen in FIG. 2.

BEST MODE FOR CARRYING OUT THE INVENTION

Figure 4:
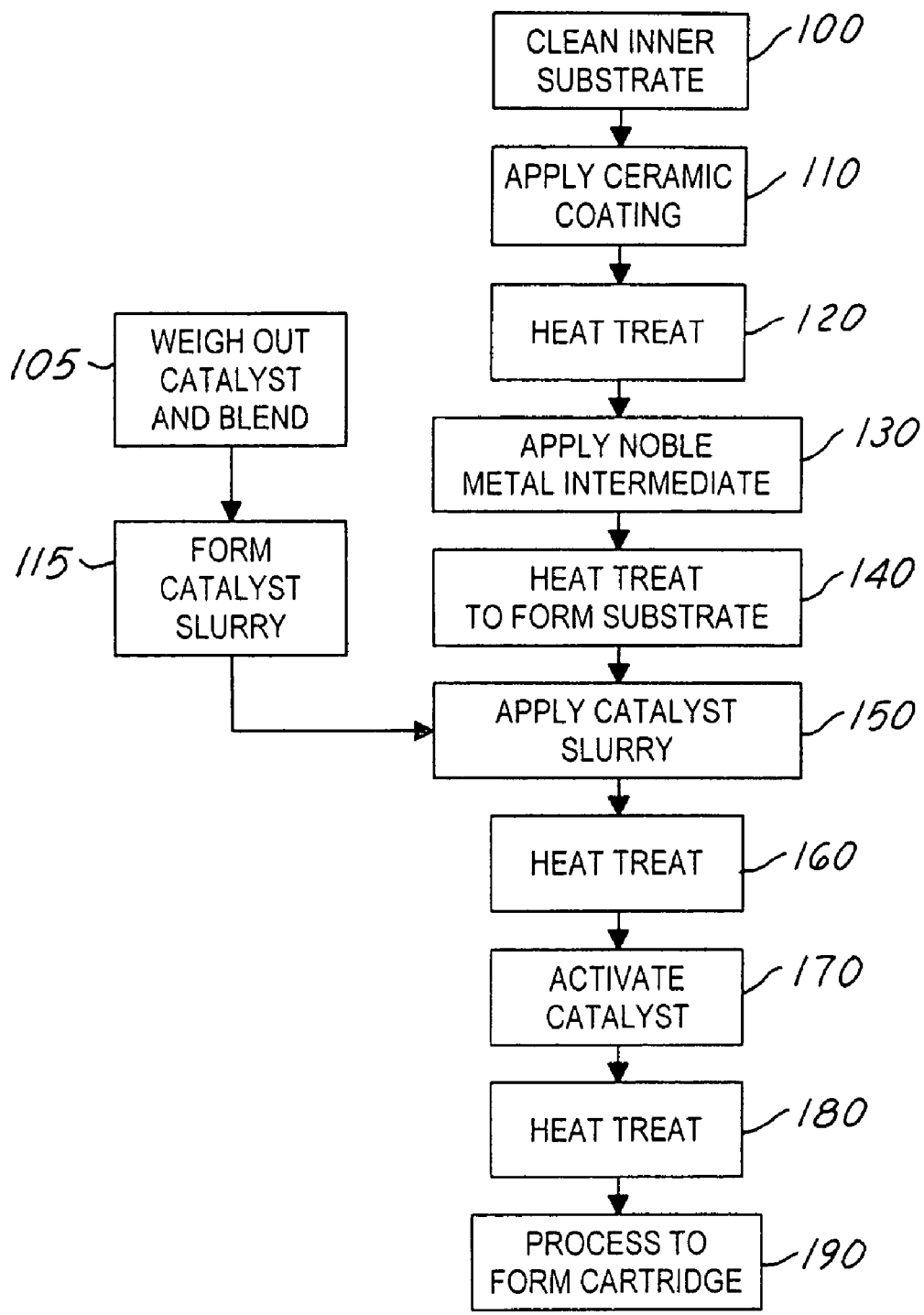
FIG. 4 is a logic flow diagram for forming the Type I or Type II catalyst of FIG. 3 and applying the catalyst to a metallic substrate material.

FIGS. 1-3 illustrate one preferred embodiment of a gas generator assembly 10 used to decompose hydrogen peroxide gas to steam and oxygen that can be subsequently used to drive gas turbines, provide thrust as a monopropellant, provide an oxidizer for bi-propellant systems, or function as an igniter for a rocket engine when combined with fuels like kerosene. The proposed system describes a method for the application of a novel catalyst material 58 to a prepared metallic substrate 60 for use in assembly of a catalyst bed 50 that can be used to decompose hydrogen peroxide gas into steam and oxygen.

The design of the assembly 10 described represents potentially infinite designs that may be used and is illustrated here for understanding of the proposed catalyst system 58 and is therefore not intended to be limiting. Preferred unique designs that utilize the proposed catalyst system 58 are also illustrated and described in co-pending U.S. application Ser. No. 10/405,049, which is herein incorporated by reference.

Referring now to FIG. 1, a schematic of a gas generator assembly 10 is shown as having housing 20 consisting of an inlet 22 and an outlet 24. Liquid hydrogen peroxide propellant 30 enters the gas generator assembly through the inlet 22. After passing through the inlet 22, the hydrogen peroxide liquid enters the catalyst bed 50. As will be described further below and in co-pending U.S. application Ser. No. 10/405, 049, a novel catalyst material (shown as 58 in FIG. 3) decomposes the hydrogen peroxide propellant 30 into steam and oxygen, hereinafter referred to as high temperature gas 40, that exits the catalyst bed 50 and exits the gas generator 10 through the outlet 24. The high temperature gas 40 is then used to drive gas turbines, provide thrust as a monopropellant, provide an oxidizer for bi-propellant systems, or function as an igniter for a rocket engine when combined with fuels like kerosene.

In the preferred embodiment, the catalyst bed 50 shown in FIG. 1 is comprised of a stack of catalyst coated wire mesh screens 51. FIG. 2 shows a single wire mesh screen 51 as used in the assembly of the catalyst bed 50 in FIG. 1.

As best shown in FIG. 3, the catalyst-coated screen 51 is comprised of an inner metallic wire substrate 52. The inner metallic substrate 52 is preferably an oxidation resistant alloy. The inner metallic substrate 52 is selected based on numerous factors, including catalyst bed operating temperatures (as determined by the concentration of peroxide 30) and the preferred form of the substrate (which includes wire meshes, tubes or corrugated sheets). Preferred inner metallic substrates 52 for use in high-percentage hydrogen peroxide propellant systems as shown in FIG. 1 include 16-wire mesh, Type 316 stainless steel screens that have high melting temperatures and oxidation resistance. Three preferred stainless steel screens 51 that meet these criteria include CRES 316, CRES 347 and CRES 304, manufactured by Allegheny Ludlum. Another preferred metallic substrate is wire mesh screen of the nickel-based superalloy, Hastelloy C-276, manufactured by Haynes International. (All screens are available from Screen Technology Group, Inc. of Washougal, Wash.)

The metallic substrate 52 is surrounded by a noble metal intermediate 56. The noble metal intermediate 56, or strike, may be a noble metal or noble metal alloy and is used to bond the catalyst 58 to the metallic substrate 52. The metal intermediate 56 may be silver or a silver-palladium alloy.

A ceramic coating 54 may be optionally be added to the metallic substrate 52 prior to introducing the noble metal intermediate 56 depending upon the composition of the metallic substrate 52. The ceramic coating 54 is preferably introduced to provide oxidation protection for the metallic substrate 52 and to prevent alloying between the metallic substrate 52 and noble intermediate 56 during subsequent processing steps requiring high temperatures or during utilization with high concentration peroxide propellants. The ceramic coating 54 preferably is a chrome oxide containing enamel frit. Any enamel frit providing good oxidation prevention may be used. One preferred ceramic coating 54 is Frit A-418, made by Ferro Corporation. The composition of Frit A-418 is shown below in Table 1:

TABLE 1

| CONSTITUENT | PARTS BY WEIGHT |
|---|---|
| XG-201 Frit | 70 |
| 44 wt. % Barium Oxide | |
| 38 wt. % Silicon Oxide | |
| 6.5 wt. % Boron Oxide | |
| 4 wt. % Calcium Oxide | |
| 1.5 wt. % Aluminum Oxide | |
| 1 wt. % Zirconium Oxide | |
| 2 wt. % Zinc Oxide | |
| Green Chrome Oxide | 30 |
| Clay | 5 |
| Water | 48 |

The ceramic coating 54 is surrounded by a noble metal intermediate 56. The noble metal intermediate 56, or strike, may be a noble metal or noble metal alloy and is used to bond the catalyst 58 to the ceramic coating 54. The metal intermediate 56 may be silver or a silver-palladium alloy. For ease of understanding, the inner metallic substrate 52, optional ceramic coating 54, and noble metal intermediate 56 are hereinafter collectively referred to as the prepared substrate material 60.

When the inner metallic substrate 52 comprises a high temperature, oxidation resistant alloy, both the ceramic coating 54 and the noble metal intermediate 56 can be optional. In such a case, the mixed metal oxide catalyst 58 can be applied directly to the inner metallic substrate according to the method outlined below.

The prepared substrate material 60 is then coated with a mixed metal oxide (MMO) catalyst 58. The mixed metal oxide catalyst 58 of the present invention is a robust, high-activity catalyst for long duration use with up to about 99% concentration hydrogen peroxide propellant 30. As such, the catalyst 58 must have a melting temperature greater than the adiabatic decomposition temperature of the hydrogen peroxide propellant 30. Two preferred mixed metal oxide catalyst 58 compositions have been found to achieve these desired results. These are Type I and Type II catalysts as described in co-pending U.S. application Ser. No. 10/404,934. In these systems, silver (Type I) or a silver-palladium alloy (Type II) are the active catalysts, while the manganese oxide and/or dysprosium oxide constitute co-catalysts (promoters). Alumina is also added to the formulation to enhance surface area, while borosilicate glass is added as a structural binder. One preferred borosilicate glass that may be utilized is Pyrex glass, available from Corning. Finally, gold is added as a promoter. The preferred compositions of the Type I and Type II catalysts are shown below in Tables 2 and 3:

TABLE 2

| CONSTITUENT | WEIGHT PERCENTAGE |
|---|---|
| Silver (Ag) | 30-50 |
| Manganese Oxide (MnO$_2$) | 20-40 |
| Alumina (Al$_2$O$_3$) | 10-20 |
| Borosilicate glass | 0-20 |
| Gold (Au) | 0-10 |

TABLE 3

| CONSTITUENT | WEIGHT PERCENTAGE |
| --- | --- |
| Silver Palladium Alloy (70 wt % Ag-30 wt % Pd) | 30-50 |
| Manganese Oxide ($MnO_2$) | 0-40 |
| Dysprosium Oxide ($Dy_2O_3$) | 0-40 |
| Alumina ($Al_2O_3$) | 10-20 |
| Borosilicate glass | 0-20 |
| Gold (Au) | 0-10 |

FIG. 4 describes a preferred method for forming the Type I and/or Type II mixed metal oxide catalyst 58 coating as shown in FIG. 2. FIG. 4 also describes the method for applying the catalyst 58 to the prepared substrate 60 and the subsequent activation of the catalyst 58. Specific details for applying the Type I and Type II catalyst systems to a metallic substrate are illustrated and described in detail below. The details provided in FIG. 4 and the following text, illustrate the preferred method for applying the catalyst systems to metallic substrates.

Referring now to FIG. 4, the process begins in Step 100 by cleaning the inner substrate 52 material to remove inorganic materials or contaminants from the surface of the substrate 52 material. For example, the stainless steel screen material described above in FIGS. 3 and 4 is introduced to a 60 degrees Celsius (140 degree Fahrenheit) alkaline bath for cleaning. Any metallic substrate, regardless of physical shape or form, would require such a cleaning process.

Next, in Step 110, the optional ceramic coating 54 is applied to the inner substrate 52 as a slurry or paste. Application methods include dipping, spraying, brushing, or air-brushing. In Step 120, the ceramic-coated inner substrate is heat treated to adhere the ceramic coating 54 to the inner substrate 52. For Frit A418, as described in FIG. 3, the coated substrate is heat treated for approximately 14 minutes at about 1060 degrees Celsius (1,940 degrees Fahrenheit). The final ceramic coating thickness, after firing, is between 10 and 100 microns. The ceramic coating 54 is not required for oxidation resistant alloys that do not form excessive oxidation product or react with the intermediate metallic layer described below.

Next, in Step 130, the noble metal intermediate 56, or strike, is applied either to the coated inner substrate 52 or ceramic coating 54, depending upon the composition of the inner substrate 52 or the operating conditions for utilizing the catalyst 58 as described above. The intermediate 56 as described above is noble metal or noble metal alloy and is applied as a paste or slurry. In Step 140, a subsequent heat treatment binds the intermediate 56 to the coated inner substrate 52 or ceramic coating 54, therein forming the prepared substrate 60. Where silver is used as the intermediate 56, the heat treatment of Step 140 is performed by slowly heating the intermediate coated screens from room temperature to about 925 degrees Celsius (1700 degrees Fahrenheit) to drive off any organic solvents, and holding the temperature at 925 degrees Celsius for 10 to 20 minutes to fuse the silver to the ceramic coating 54. After the hold, the screens are removed from the furnace. The thickness of the fused intermediate coating 56 is uniform and preferably has a thickness of between 10 and 100 microns.

In Step 105, the constituent dry powders of the catalyst 58 as described in either Table 2 or Table 3 above are weighed out and placed in a suitable container for blending. The powders of each constituent should not exceed about 10 microns to ensure good catalytic activity. The actual powder size is dependent upon the actual application method chosen below.

Next, in Step 115, an organic solvent, combined with an oil-based surfactant, is mixed with the blended powders to generate a slurry of uniform consistency. The viscosity of the slurry should be adjusted based on the type of application process so as to allow application of a uniform coating layer.

Next, in Step 150, the slurry composition is applied to the prepared substrate 60 to a uniform thickness. The slurry composition may be applied in any number of preferred processes known in the art, including dipping, painting, spraying, or brushing. The slurry composition is then allowed to dry to the prepared substrate 60 to remove the organic solvent. Gentle heating may also be used to volatilize any remaining solvent material.

Next, in Step 160, the catalyst-coated substrate is heat treated to bind the mixed metal oxide catalyst material 58 to the prepared substrate 60. To achieve this, the catalyst-coated substrate is introduced to an air furnace oven that is initially kept at or below about 150 degrees Celsius (300 degrees Fahrenheit). The furnace temperature is slowly increased to between approximately 840 and 1040 degrees Celsius (1550-1900 degrees Fahrenheit) and held at this temperature for about 30 to 240 minutes, depending upon the formulation of the catalyst material 58. After the prescribed hold, the part is slowly cooled to room temperature in an air atmosphere. After firing, the catalyst coating should be uniform in appearance and between 10 and 400 microns in thickness.

For the Type I catalysts shown in Table 2 and for the Type II catalysts shown in Table 3, a heat treatment to 925 degrees Celsius with a hold of about 120 minutes is preferred.

Next, in Step 170, the mixed metal oxide catalyst receives an appropriate activation treatment. Next, in Step 180, the applied activation treatment is calcined in an air furnace. The process of Steps 170 and 180 may be repeated as desired.

For metallic substrates with the Type I catalyst system applied, the activation treatment consists of a samarium nitrate hexahydrate solution. The solution is prepared and applied to the catalyst coated substrate by dipping, brushing, spraying or air-brushing and allowed to dry. After drying, the solution is calcined in an air furnace for approximately 30 minutes at about 175 degrees Celsius (about 350 degrees Fahrenheit). The process is repeated for a total of between 3 and 5 calcining cycles.

For metallic substrates with the Type II catalyst system applied, the activation treatment consists of a noble metal loaded nitric acid solution. The solution is prepared by fully dissolving a portion of the silver-palladium alloy (shown in Table 2 above) in concentrated nitric acid. The solution is then applied to the catalyst coated substrate by dipping, brushing, spraying or air-brushing and allowed to dry. After drying, the solution is calcined in an air furnace for approximately 20 minutes at about 230 degrees Celsius (about 450 degrees Fahrenheit). The process is repeated for a total of between 2 and 5 calcining cycles.

In addition, the catalysts as described above can be used in other propellant decomposition systems. For example, the Type II catalyst, applied to a metallic substrate, has been used in the catalytic combustion of methane. This indicates that these catalysts may be used in the catalytic combustion or decomposition of other hydrocarbon propellants.

While the invention has been described in terms of preferred embodiments, it will be understod, of course, that the invention is not limited thereto since modifications may be made by those skilled in the art, particularly in light of the foregoing teachings.

What is claimed is:

1. A method for applying a mixed metal oxide catalyst system to a metallic substrate to form a high-temperature catalyst for use in the decomposition of hydrogen peroxide or other propellant comprising:
   providing a prepared metallic substrate;
   forming a high-activity catalyst composition, wherein said high-activity catalyst composition comprising between about 10 to 20 weight percent of alumina and being selected from the group consisting of a Type I catalyst composition and a Type II catalyst composition;
   combining an organic solvent with said high-activity catalyst composition to form a catalyst slurry, said organic solvent being volatile under gentle heating;
   applying a layer of said catalyst slurry to said prepared metallic substrate;
   drying said catalyst slurry applied on said prepared metallic substrate to form a layer of a catalyst material on said prepared substrate to form a catalyst coated prepared substrate;
   binding said layer of said catalyst material to said prepared metallic substrate thus forming a binded layer on said prepared substrate;
   applying an activation treatment to said binded layer; and
   calcining said activation treatment to said binded layer.

2. The method of claim 1, wherein forming a high-activity catalyst composition comprises dry blending a plurality of ingredients to form a high-activity catalyst powder, said high-activity catalyst powder comprising:
   about 30 to 50 weight percent of silver;
   about 20 to 40 weight percent of manganese dioxide;
   about 10 to 20 weight percent of alumina;
   about 0 to 20 weight percent of borosilicate glass; and
   about 0 to 10 weight percent of gold.

3. The method of claim 2, wherein each of said plurality of ingredients comprising said high-temperature catalyst powder has an initial form of a powder having an average particle size is about 10 microns or less.

4. The method of claim 2, wherein applying an activation treatment to said binded layer and calcining said activation treatment comprises:
   (a) applying a samarium nitrate hexahydrate solution to said binded layer;
   (b) drying said samarium nitrate hexahydrate solution;
   (c) introducing said binded layer having said dried samarium nitrate hexahydrate layer to an air furnace having a temperature of approximately 350 degrees Fahrenheit;
   (d) calcining said samarium hexahydrate solution for approximately 30 minutes; and
   (e) repeating steps (a) through (d) between 2 and 4 times.

5. The method of claim 2, wherein said prepared metallic substrate comprises a high-temperature alloy substrate.

6. The method of claim 5, wherein said high temperature alloy substrate comprises a high temperature, oxidation resistant alloy substrate.

7. The method of claim 6, wherein said high temperature, oxidation resistant alloy substrate comprises a 16-wire mesh, Type 316 stainless steel screen substrate.

8. The method of claim 6, wherein said 16-wire mesh, Type 316 stainless steel screen substrate is selected from the group consisting of CRES 316, CRES 347 and CRES 304.

9. The method of claim 6, wherein said high temperature, oxidation resistant alloy substrate comprises a nickel-based superalloy substrate.

10. The method of claim 9, wherein said nickel-based superalloy substrate comprises Hastelloy C-276.

11. The method of claim 1, wherein forming a high-activity catalyst composition comprises dry blending a plurality of ingredients to form a high-activity catalyst powder, said high-activity catalyst powder comprising:
   about 30 to 50 weight percent of silver-palladium alloy;
   about 0 to 40 weight percent of manganese dioxide;
   about 0 to 40 weight percent of dysprosium oxide;
   about 10 to 20 weight percent of alumina;
   about 0 to 20 weight percent of borosilicate glass; and
   about 0 to 10 weight percent of gold.

12. The method of claim 11, wherein each of said plurality of ingredients comprising said high-temperature catalyst powder has an initial form of a powder having an average particle size is about 10 microns or less.

13. The method of claim 11, wherein applying an activation treatment to said binded layer of said catalyst material comprises:
   (a) dissolving a portion of said silver-palladium alloy into a solution of concentrated nitric acid to form a loaded nitric acid solution;
   (b) applying said loaded nitric acid solution to said binded layer;
   (c) drying said loaded nitric acid solution to said binded layer;
   (d) introducing said binded layer having said dried loaded nitric acid layer to an air furnace having a temperature of approximately 450 degrees Fahrenheit;
   (e) calcining said binded layer for approximately 20 minutes; and
   (f) repeating steps (a) through (e) between 1 and 4 times.

14. The method of claim 1, wherein binding said layer of said catalyst material to said prepared metallic substrate to form a binded layer on said prepared substrate comprises:
   introducing said catalyst coated prepared metallic substrate to an oven having a temperature below 300 degrees Fahrenheit;
   increasing the temperature of said oven to between approximately 1550 and 1900 degrees Fahrenheit;
   holding said layer of said catalyst material on said prepared metallic substrate within said oven for approximately between 30 and 240 minutes; and
   cooling said layer of said catalyst material on said prepared metallic substrate to room temperature to form a binded layer on said prepared metallic substrate, wherein the thickness of said binded layer of said catalyst material is between approximately 10 and 400 microns.

15. The method of claim 1, wherein providing a prepared metallic substrate comprises:
   providing a high-temperature alloy substrate; and
   applying a layer of a ceramic coating to said high-temperature alloy substrate to from a prepared metallic substrate.

16. The method of claim 15, wherein applying a layer of a ceramic coating to said high-temperature alloy substrate to form a prepared metallic substrate comprises:
   applying a layer of a ceramic coating to said high-temperature alloy substrate; and
   heat treating said layer of ceramic coating to adhere said layer of ceramic coating to said high-temperature alloy substrate, wherein said layer of ceramic coating has a thickness between approximately 10 to 100 microns after the heat treatment.

17. The method of claim 16, wherein said ceramic coating comprises a chromium oxide containing enamel frit.

18. The method of claim 1, wherein providing a prepared metallic substrate comprises:
   providing a high-temperature alloy substrate; and applying a layer of a ceramic coating to said high-temperature alloy substrate; and applying a layer of a noble metal intermediate to said ceramic coating to from a prepared substrate.

19. The method of claim 18, wherein applying a noble metal intermediate to said ceramic coating to form a prepared metallic substrate material comprises:

introducing a layer of silver to said layer of said ceramic coating; and heat treating said layer of silver to bind said layer of silver to said layer of said ceramic coating.

20. The method of claim 18, wherein applying a noble metal intermediate to said ceramic coating to form a prepared metallic substrate comprises:

introducing a layer of a silver-palladium alloy to said ceramic coating; and heat treating said layer of said silver-palladium alloy to bind said layer of silver-palladium alloy to said ceramic coating.

21. The method of claim 1, wherein providing a prepared metallic substrate comprises:

providing a high-temperature alloy substrate; and applying a layer of noble metal intermediate to said high-temperature alloy substrate to from a prepared metallic substrate.

22. The method of claim 21, wherein applying a noble metal intermediate to said high-temperature alloy substrate to form a prepared metallic substrate material comprises:

introducing a layer of silver to said high-temperature alloy substrate; and heat treating said layer of silver to bind said layer of silver to said high-temperature alloy substrate.

23. The method of claim 21, wherein applying a noble metal intermediate to said ceramic coating to form a prepared metallic substrate comprises:

introducing a layer of silver-palladium alloy to said high-temperature alloy substrate; and heat treating said layer of silver-palladium alloy to bind said layer of silver-palladium alloy to said high-temperature alloy substrate.

\* \* \* \* \*

UNITED STATES PATENT AND TRADEMARK OFFICE
CERTIFICATE OF CORRECTION

PATENT NO. : 7,510,995 B2
APPLICATION NO. : 10/404935
DATED : March 31, 2009
INVENTOR(S) : Sevener et al.

It is certified that error appears in the above-identified patent and that said Letters Patent is hereby corrected as shown below:

Claim 8, Column 7, Line 60: Change "claim 6" to "claim 7"

Claim 18, Column 9, Line 4: Change "from" to "form"

Claim 21, Column 10, Line 3: Change "from" to "form"

Claim 23, Column 10, Line 13: Change "said" to "a"

Signed and Sealed this

Fourteenth Day of December, 2010

David J. Kappos
*Director of the United States Patent and Trademark Office*